US008650405B1

(12) United States Patent  (10) Patent No.: US 8,650,405 B1
Dotan et al.  (45) Date of Patent: Feb. 11, 2014

(54) AUTHENTICATION USING DYNAMIC, CLIENT INFORMATION BASED PIN

(75) Inventors: Yedidya Dotan, Tel Aviv (IL); Lawrence N. Friedman, Arlington, MA (US); Oleg Freylafert, Hod Hasharon (IL); Robert S. Philpott, Andover, MA (US); Daniel Schiappa, Bedford, NH (US)

(73) Assignee: EMC Corporation, Hopkinton, MA (US)

( * ) Notice: Subject to any disclaimer, the term of this patent is extended or adjusted under 35 U.S.C. 154(b) by 140 days.

(21) Appl. No.: 13/173,607

(22) Filed: Jun. 30, 2011

(51) Int. Cl.
*G06F 21/00* (2013.01)
(52) U.S. Cl.
USPC ........................................................ 713/182
(58) Field of Classification Search
USPC ........................................................ 713/182
See application file for complete search history.

(56) References Cited

U.S. PATENT DOCUMENTS

2006/0020813 A1* 1/2006 Birk et al. ...................... 713/182
2009/0119160 A1* 5/2009 Woda et al. ..................... 705/10

OTHER PUBLICATIONS

Bowness, Piers, "One-Time Password Authentication Employing Local Testing of Candidate Passwords From One-Time Password Server," U.S. Appl. No. 12/750,758, filed Mar. 31, 2010.
Dotan, Yedidya, "Techniques for Authenticating Users of Massive Multiplayer Online Role Playing Games Using Adaptive Authentication," U.S. Appl. No. 12/751,057, filed Mar. 31, 2010.
Duane, William, "Method and Apparatus for Secure Validation of Tokens," U.S. Appl. No. 12/114,245, filed May 2, 2008.
Griffin et al., "Tokenization of Multiple-Field Records," U.S. Appl. No. 12/980,421, filed Dec. 29, 2010.
Jakobsson et al., "Identity Authentication System and Method," U.S. Appl. No. 10/724,034, filed Nov. 26, 2003.
Juels et al., "Cryptographic Methods and Apparatus for Secure Authentication," U.S. Appl. No. 10/216,030, filed Aug. 9, 2002.
Rosenthol et al., "Secure Management of User Information Using Tokenization and Token States," U.S. Appl. No. 12/730,529, filed May 24, 2010.
Vaystikh et al., "Methods and Apparatus for Authenticating a User Using Dynamic Client-Side Storage Values," U.S. Appl. No. 13/077,076, filed Mar. 31, 2011.

\* cited by examiner

*Primary Examiner* — Philip Chea
*Assistant Examiner* — Daniel Hoang
(74) *Attorney, Agent, or Firm* — BainwoodHuang

(57) ABSTRACT

An improved PIN-based authentication technique for authenticating the user of a client machine to a server automatically generates a personal identification number (PIN) for the user based on user-specific authentication information, such as encrypted cookie information. The server provides user-specific authentication information to a client machine. When the user submits an authentication request, user-specific authentication information is collected and uploaded to the server. The user-specific authentication information is processed to form a PIN, and authentication of the user proceeds based on the PIN and any other authentication factors provided. Since the disclosed techniques compute PINs automatically based on information exchanged between a client machine and a server, the user is relieved of any burden associated with registering and remembering a PIN.

21 Claims, 5 Drawing Sheets

AUTHENTICATION USING DYNAMIC, CLIENT INFORMATION BASED PIN

BACKGROUND

Websites and other online resources typically require authentication before a user is granted access to sensitive information. Conventional forms of user authentication include user identifiers, passwords, personal identification numbers (PINs), and/or token codes.

Some online systems used PIN-based authentication. In these systems, a user registers a PIN with a server and then manually enters the PIN each time the user attempts to log on. The PIN is generally four to eight digits long. The server receives the PIN and admits the user if the PIN matches the registered value for that user.

Some systems use token code based authentication. As is known, token codes are multi-digit codes generated by portable devices, such as key fobs, which generate new codes periodically, such as every few seconds. A portable token code device is synchronized with a server so that both generate the same codes at the same times, thereby allowing the token codes to function as temporary passwords. A popular example of this type of device is the SecurID®, which is available from RSA Security Inc. of Bedford, Mass.

Some systems employ multiple authentication factors. A common two-factor scheme requires a user to enter both a PIN and a token code. This approach thus combines something the user knows (the PIN) with something the user holds (the token code). In a typical example, a user enters both a PIN and a token code in a single passcode field of a login screen. The user then submits the entered values to the server, which tests them against expected values to allow or deny access to the user.

SUMMARY

PIN-based authentication can be used alone or in combination with token codes or other factors to afford a high level of security. Unfortunately, however, PINs can be inconvenient. Users need to register their PINs. Registration usually entails the user visiting a website of the web application or other online resource to which authentication is sought. The user may have to answer questions and is sometimes asked to follow additional procedures to ensure safe delivery of the PIN. The user may be required to respond to an email message or even wait for a PIN to arrive via postal service, before registration can be completed. Registration can therefore be time consuming. In addition, PINs can be forgotten. Users who have forgotten their PINs generally need to re-register and are therefore subject again to time consuming procedures.

The need to remember PINs is both an inconvenience and a security risk. Users often need to use PINs for many different on-line applications. Users may write down their PINs in presumably safe locations, but malicious parties can sometimes discover and steal the PINs. If a user decides to use only a single PIN for different websites, in an effort to avoid having to remember multiple PINs, the chance that the PIN will be stolen increases. The effects of PIN theft also increase, as a single stolen PIN may allow malicious entry to multiple websites.

An improved PIN-based authentication technique for authenticating a user of a client machine to a server overcomes the aforementioned shortcomings of conventional PIN-based authentication by automatically generating a PIN for the user based on user-specific authentication information. "User-specific authentication information" means any information that is reasonably specific to the user. Absolute specificity is preferred but not required. The server provides user-specific authentication information to the client machine. When the user makes an authentication request, user-specific authentication information is collected from the client machine and copied to the server. The user-specific authentication information is processed to form a PIN, and authentication of the user proceeds based on the PIN and any other authentication factors provided.

In certain embodiments, the server maintains a counterpart copy of any user-specific authentication information sent to the client machine. During an authentication request, the server identifies user-specific authentication information in the counterpart copy, which corresponds to the user-specific authentication information obtained from the client machine, and computes an expected value for the PIN. If the PIN matches the expected value, authentication proceeds assuming other authentication factors are satisfied.

In some arrangements, the user-specific authentication information includes multiple elements, and the client machine has multiple locations. In these arrangements, the client machine receives instructions from the server to store different elements of the user-specific authentication information in different locations of the client machine. Some of the elements of user-specific authentication information include redundant copies of information needed to generate a PIN. The ability to store redundant information in different locations promotes persistence and helps to ensure that PINs can be created even if some of the elements of user-specific authentication information are deleted.

By automatically creating PINs based on information stored on a user's machine, the embodiments disclosed herein overcome the inconvenient aspects of conventional, manually entered PINs. They relieve users of having to register and remember their PINs and promote enhanced security. The techniques disclosed can also be applied in applications that previously have not involved the use of PINs. These applications can be upgraded to use PINs as described herein, enhancing security without placing additional burdens on users.

Certain embodiments are directed to a method of authenticating a user. The method includes providing user-specific authentication information to a client machine and receiving an authentication request from the client machine. The authentication request includes (i) a user identifier identifying the user from among multiple users and (ii) the user-specific authentication information. The method further includes directing a personal identification number (PIN) to be computed based on the user-specific authentication information and performing an authentication operation based on the received user identifier and the PIN.

Other embodiments are directed to a non-transitory computer readable media. The media includes instructions which when executed by a processor cause the processor to perform a method as described above of authenticating a client machine.

Additional embodiments are directed to a server that includes an interface and a controller coupled to the interface. The controller is constructed and arranged to provide, via the interface, user-specific authentication information to a client machine and receive, via the interface, an authentication request from the client machine. The authentication request includes (i) a user identifier identifying the user from among multiple users and (ii) the user-specific authentication information. The controller can compute a personal identification number (PIN) based on the user-specific authentication information and perform an authentication operation based on the received user identifier and the PIN.

Still further embodiments are directed to an authentication method to be performed by a client machine. The method includes receiving, by the client machine, user-specific authentication information and storing different elements of the received user-specific authentication information in different folders of a file system of the client machine. The client machine collects a set of elements of the stored user-specific authentication information from at least two folders of the file system and computes a personal identification number (PIN) based on the collected set of elements. The method further includes issuing an authentication request to the server. The authentication request includes (i) a user identifier to identify the user from among multiple users, (ii) a token code obtained from an authentication token, and (iii) the computed PIN.

BRIEF DESCRIPTION OF THE DRAWINGS

The foregoing and other features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention. In the drawings.

DETAILED DESCRIPTION

An improved technique for PIN-based authentication to a server generates a PIN on behalf of a user automatically based on user-specific authentication information that the server has previously provided to the client machine.

Automatically generated PINs can be used in single-factor authentication or with other authentication factors. In one example, automatically generated PINs as disclosed herein are used in connection with token codes from portable devices, such as SecurID® key fobs, to provide two-factor authentication. A user enters his or her user identifier ("user ID") and token code into fields of a login screen. The server collects user-specific authentication information from the user's machine and automatically generates a PIN. The server checks the PIN and token code for the identified user. Authentication is allowed or denied accordingly.

In an example, user-specific authentication information is provided in the form of encrypted cookies. Preferably, different types of cookies are used, such as browser cookies, Flash cookies, and SilverLight cookies, for example. The cookies are stored in different locations of the client machine (e.g., folders, directories, objects, registry settings, and the like). In one example, browser cookies can be stored in a browser folder, Flash cookies can be stored in a Flash folder, and SilverLight cookies can be stored in a SilverLight folder. Although users might delete their browser cookies, other types of cookies are harder to remove and thus tend to be persistent over time.

Figure 1:
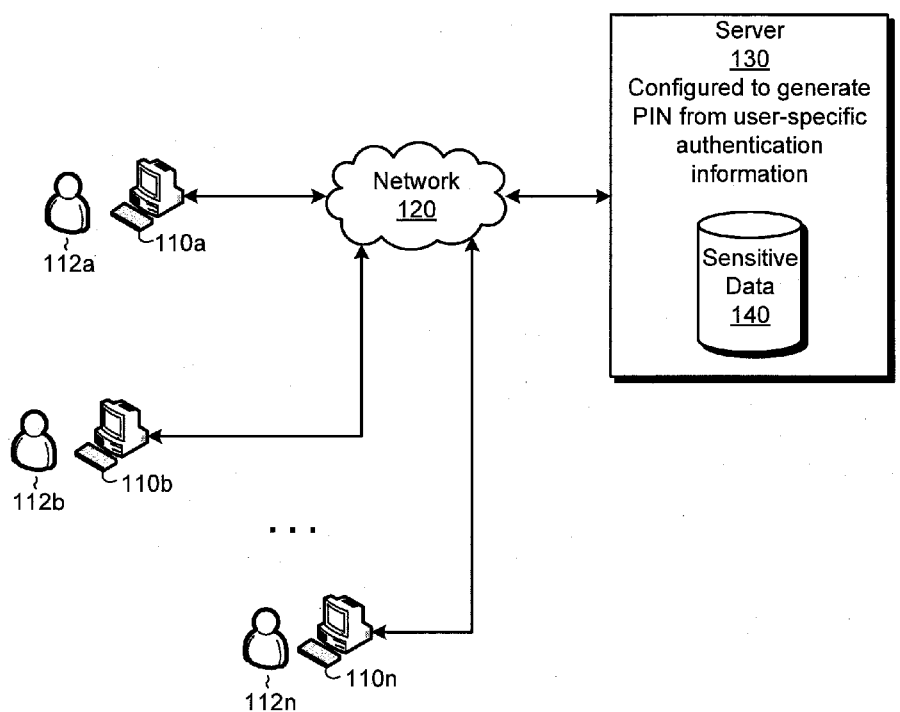
FIG. 1 is a block diagram of an example environment in which PIN-based authentication with user-specific authentication information can be performed.

FIG. 1 shows an example environment in which PINs can be generated from user-specific authentication information. The system includes client machines 110a-n, which are operable by human users 112a-n, for connecting, via a network 120, to a server 130. The server 130 includes a sensitive data store 140.

The client machines 110a-n can be any type or types of computing device, such as desktop computers, workstations, laptop computers, tablet computers, smart phones, PDA's, gaming consoles, or set-top boxes, for example. The network 120 can be any type or types of network, such as the Internet, a local area network, a wide area network, a satellite network, a telephone network, a cable television network, or a combination of any of the above, for example. Preferably, the server 130 is a computer, or group of computers, configured for running network-based applications and handling large numbers of users. This is not required, however. Alternatively, the server 130 can be any type of computing device or devices, such as any of those mentioned above for the client machines 110a-n. Where the server 130 includes multiple computers, the different computers can be located within a single local or wide area network or across different local or wide area networks that are interconnected by the network 120. The sensitive data can be any type of information to which access is restricted, such as financial information, government information, personal information, or organizational information, for example.

In operation, the server 130 runs a web application that requires users 112a-n to be authenticated before being granted access to the sensitive data store 140. Users 112a-n access the web application from their client machines 110a-n, enter their user IDs and token codes, and submit authentication requests to the server 130. User-specific authentication information is uploaded from the client machines 110a-n to the server 130 and used to calculate PINs. The server 130 then applies the user IDs, token codes, and computed PINs to authenticate the users.

Figure 2:
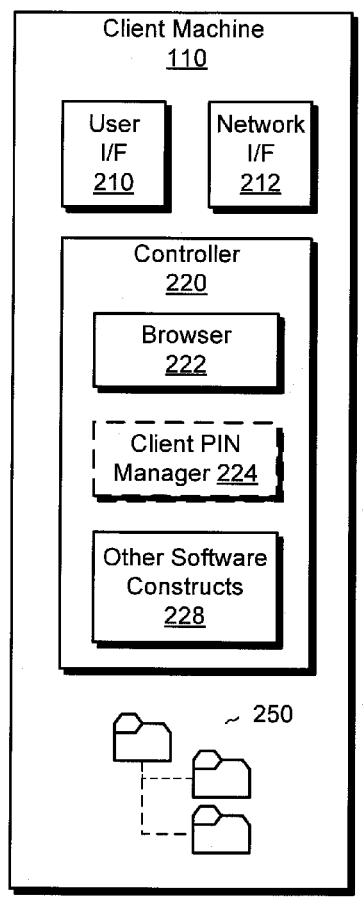
FIG. 2 is a block diagram of an example client machine as shown in FIG. 1.

FIG. 2 shows an example of the client machine 110 in greater detail. Here, it is seen that the client machine 110 includes a user interface 210 (such as a display, pointer device, and keyboard) for interacting with a user 112, a network interface 212 (such as a network card, associated cables, and modem) for connecting to the network 120), a controller 220, and a file system 250.

The controller 220 includes a browser 222 and other software constructs 228, such as an operating system, applications, processes, and the like. The controller 220 may optionally include a client PIN manager 224. The client PIN manager 224 can compute PIN values based on user-specific authentication information on the client machine 110. The browser 222 communicates with the user 112 via the user interface 210 and communicates with the server 130 via the network interface 212. The browser 222 is configured to display web pages, receive user input, and execute downloaded scripts (e.g., Java modules, JavaScript, Flash code, etc.). The downloaded scripts can perform a wide range of actions on the client machine 110, including accessing the file system 250 of the client machine 110, for reading and writing user-specific authentication information.

In some arrangements, the controller 220 is implemented using one or more processors (e.g., microprocessors, processing boards, and the like) and memory, and thereby forms a specialized circuit when executing the browser 222, client PIN manager 224, and other software constructs 228. In other arrangements, the controller 220 is implemented using one or more Application-Specific Integrated Circuits (ASICs), Field-Programmable Gate Arrays (FPGAs), or other types of circuits.

Figure 3:
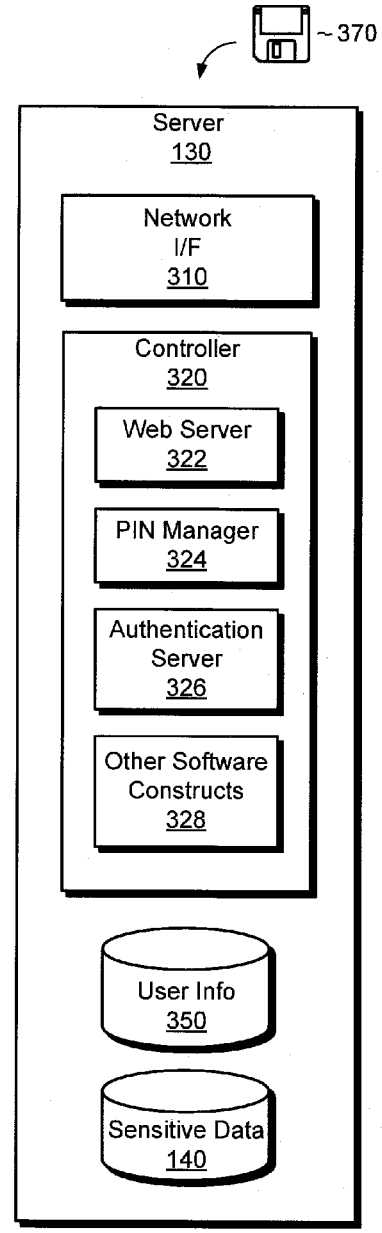
FIG. 3 is a block diagram of an example server as shown in FIG. 1.

FIG. 3 shows an example of the server 130 in greater detail. The server 130 includes a network interface 310 (e.g., network card, cables, and modem), a controller 320, and a user information database 350, as well as the sensitive data store 140 (FIG. 1). The controller 320 of the server 130 includes a web server 322, a PIN manager 324, an authentication server 326, and other software constructs 328 (e.g., operating system, applications, processes, and the like).

The web server 322 transmits web pages and other content to the client machines 110a-n of various users 112a-n via the network interface 310. The web server 322 also receives page requests, data, and other transmissions from the various client machines 110a-n via the network interface 310.

The PIN manager 324 is a software construct configured to generate and manage user-specific authentication information and to create PINs from user-specific authentication information. User-specific authentication information can be generated in any suitable way. In one example, the PIN manager 324 generates user-specific authentication information using a random number generator. The PIN manager 324 preferably computes PINs by calculating hash codes from different sets of user-specific authentication information.

The authentication server 326 is a software construct configured to manage the authentication of users 112a-n. The authentication server 326 operates in coordination with the web server 322 and PIN Manager 324 to receive authentication information from users 112a-n, to receive PINs from the Pin manager 324, and to test the users' credentials. The authentication server 326 can issue responses allowing or denying access to users, or requesting further information to confirm users' identities.

Although the web server 322, PIN manager 324, and authentication server 326 are separate software constructs, there is no need for these constructs to exist in physically separate form. For example, the web server 322, PIN manager 324, and authentication server 326 need not be provided in separate files or modules. In contrast, there are examples in which these constructs are provided on physically separate computing machines. In one implementation, a first server machine includes the web server 322, a second server machine includes the PIN manager 324, and a third server machine includes the authentication server 326. In this implementation, the three server machines operate together to form the server 130.

In some arrangements, the controller 320 is implemented using one or more processors (e.g., microprocessors, processing boards, and the like) and memory, and thereby forms a specialized circuit when executing the web server 322, PIN manager 324, authentication server 326, and other software constructs 328. In other arrangements, the controller 320 is implemented using one or more Application-Specific Integrated Circuits (ASICs), Field-Programmable Gate Arrays (FPGAs), or other types of circuits.

Figure 4:
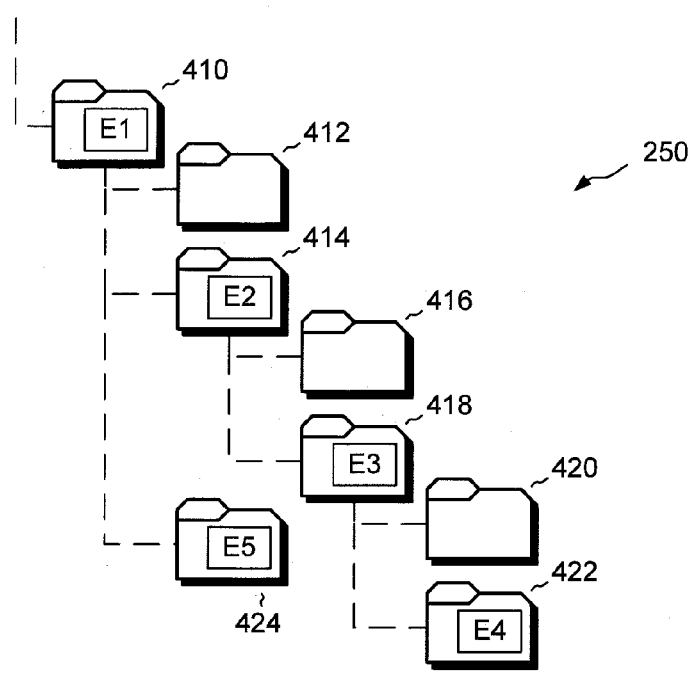
FIG. 4 is a block diagram of folders of a file system of the client machine of FIG. 2.

FIG. 4 shows a file structure 250 of the client machine 110. The file structure 250 is seen to include a hierarchy of folders, i.e., folders 410, 412, 414, 416, 418, 420, 422, and 424. Some of these folders include elements of user-specific authentication information. For example, folders 410, 414, 418, 422, and 424 respectively include elements E1-E5. In some examples, elements E1-E5 are cookies, such as browser cookies, Flash cookies, and/or SilverLight cookies. In other examples, elements E1-E5 are information stored in cookies, such as name and value pairs. In yet other examples, elements E1-E5 are database records, text files, entries in text files, and/or other forms of stored data. Regardless of the form they take, the elements E1-E5 are preferably encrypted.

Figure 5:
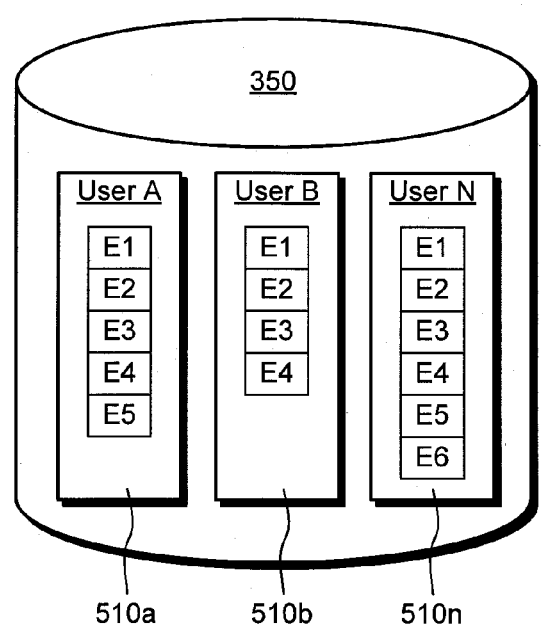
FIG. 5 is a block diagram of an example user information database of the server of FIG. 3.

FIG. 5 shows an example user information database 350 in greater detail. The user information database 350 is seen to include regions 510a-n for storing counterpart copies of user-specific authentication information of respective users 112a-n, e.g., each region corresponds to a different user ID. Each region stores a counterpart copy of the user-specific authentication information provided to the respective user's client machine 110.

Preferably, user-specific authentication information is frequently refreshed. On a regular basis, such as every time a user logs on, new elements of user-specific authentication information are downloaded to the user's machine 110. The counterpart copy for that user (i.e., one of 510a-n) is updated with the same element(s) to maintain a correspondence between the elements on the client machine 110 and the elements on the server 130. Depending on the activity of different users 112, different numbers of elements of user-specific authentication information can be stored. Also, on a regular basis, older elements of user-specific authentication information can be deleted (from both the client machine 110 and the server 130). The user-specific authentication information for a user is therefore dynamic, making it a moving target to potential hackers.

Elements of user-specific authentication information preferably include redundant copies of the same information. For example, for User A, element E1 can have at least some data in common with elements E3 and E5. In this manner, the redundantly distributed data can be recovered, and therefore PINs can be generated, even if some of the elements are deleted. Distributing the redundant data to different folders of the file system 250 helps to preserve the data and therefore promotes its persistence.

It is preferable, however, that no single element of user-specific authentication information contain all the information needed to generate a PIN. Rather, the information needed to generate a PIN is preferably distributed among different elements of user-specific authentication information. A malicious user therefore would have to acquire multiple elements before having all the information from which a PIN can be computed.

Also, some of the elements of user-specific authentication information preferably contain no information relevant to generating a PIN. Those elements are included merely to confound malicious users.

In some implementations, the user information database 350 also stores machine-specific information. "Machine-specific information" is information obtained from a client machine 110 that can be used to help distinguish a user's machine from other users' machines. Examples of machine-specific information include IP address, location information, browser type, preferred browser language, user agent strings, and/or concept parts, for example. Machine-specific information for particular users is stored along with the elements of user-specific authentication information in the regions 510a-n. The machine-specific information can be used as an aid in authenticating users, i.e., it can be compared with information read back from a client machine of a user attempting authentication. The machine-specific information can also be used in generating PINs.

In one example, PINs are generated by collecting elements of user-specific authentication information and computing hash codes. For example, the PIN manager 324 can collect elements E2, E3, and E5 for User A, collect certain portions of data contained within those elements, and compute a hash code from the collected portions. The hash code can have any arbitrary number of characters, but preferably contains between four and eight characters. This process is conducted both for the elements of user-specific authentication information obtained from the client machine 110 and for corresponding elements in the counterpart copy. The same algorithm is used to generate hash codes in both cases, allowing the hash codes to be compared directly.

Machine-specific information can also be used in computing PINs. For instance, PINs can be determined by computing hash codes of data obtained from selected elements of user-specific authentication information along with data obtained from selected elements of machine-specific information. Including both user-specific authentication information and machine-specific information in a PIN computation provides further assurance that the user is genuine. Even if a hacker somehow manages to obtain all the necessary elements of user-specific authentication information, the hacker's machine will almost certainly have different settings from those of the user the hacker is attempting to impersonate, and therefore the hacker will not be able to recreate the legitimate user's PIN.

Figure 6:
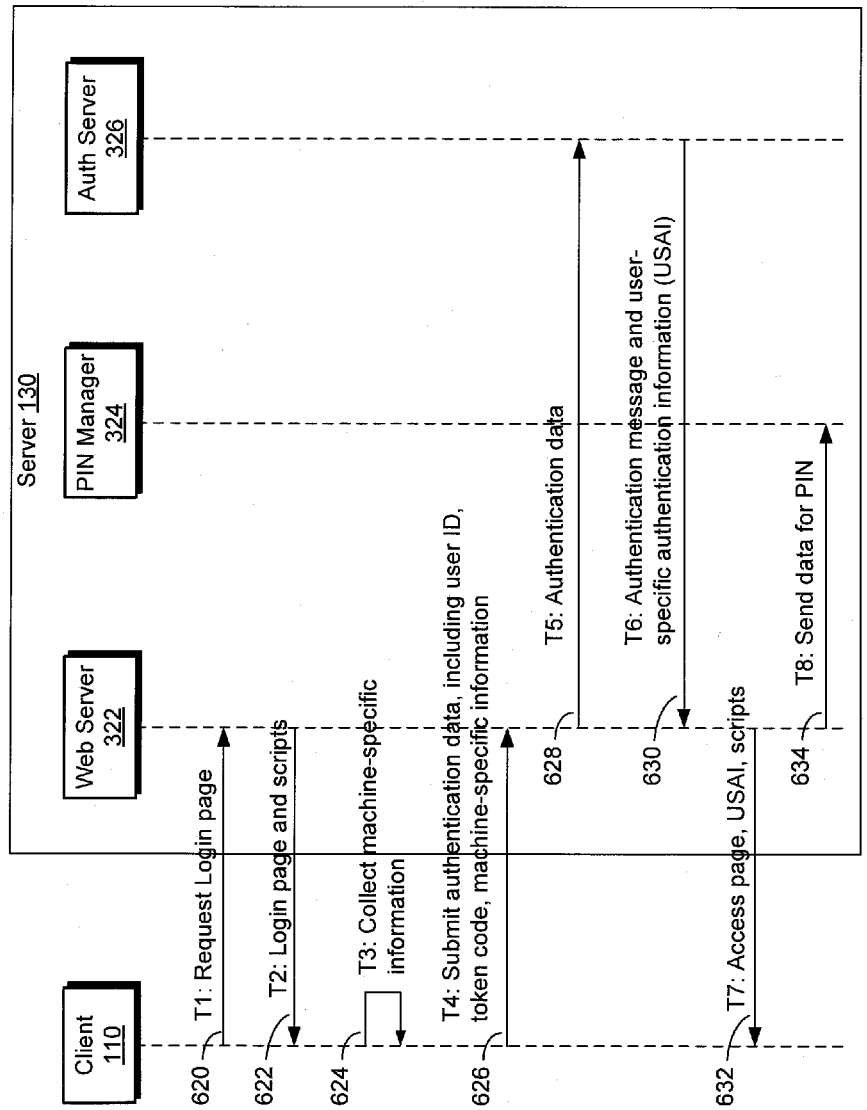
FIG. 6 is a sequence diagram showing an example process for managing an initial login of a user and for providing user-specific authentication information to the client machine of FIG. 2.

FIG. 6 is a diagram showing a sequence of events for logging on a user 112, obtaining machine-specific information from the user's machine 110, and seeding the user's machine 110 with user-specific authentication information. The sequence of FIG. 6 is generally performed the first time the user 112 logs on. Activities in FIG. 6 are conducted among a client machine 110 and the server 130, which includes the web server 322, the PIN manager 324, and the authentication server 326.

At time T1, the client machine 110 sends a login request to the web server 322 (event 620). For example, a user of the client machine 110 may open his or her browser and enter the URL of a web application, such as a banking application, running on the web server 322.

At time T2, the web server 322 responds to the login request by sending a login page and scripts to the client machine 110 (event 622). The scripts can be included in a header or body of the login page, or can be included in separate files. The user enters his or her user ID and token code from a portable token code device in respective fields of the login page.

At time T3, the scripts execute on the client machine 110 and collect machine-specific information (event 624). As indicated, the machine-specific information may include IP address, location information, browser type, preferred browser language, user agent strings, and/or concept parts, for example.

At time T4, authentication data is submitted from the client machine 110 to the web server 322 (event 626). For example, the user clicks a "submit" button. The authentication data includes the user ID, token code, and the collected machine-specific information.

At time T5, the web server 322 forwards the authentication data to the authentication server 326 (event 628). For this first login attempt, the authentication server 326 may grant access to the user if the received token code for that user (as designated by the user ID) matches an expected value. If the token code does not match the expected value, authentication may be denied.

At time T6, the authentication server 626 sends an authentication message (e.g., "allow" or "deny") to the web server 322 (event 630). Elements of user-specific authentication information are also sent to the web server 322 at this time.

At time T7, the web server 322 sends the client machine 110 a web page providing access to the user's account (event 632). The web server 322 also sends the elements of user-specific authentication information from event 630 to the client machine 110 along with scripts for storing the elements in the file system 250 of the client machine 110.

At time T8, the web server 322 sends the elements of user-specific authentication information to the PIN manager 324 (event 634). The PIN manager 324 stores these elements in the user information database 350 in a region designated for the user. The elements of user-specific authentication information stored at this time correspond to the elements of user-specific authentication information stored in the client machine during event 632.

At the completion of the sequence of FIG. 6, the client machine 110 is seeded with elements of user-specific authentication information, the server 130 is provided with a counterpart copy of the user-specific authentication information, and the server 130 has obtained a collection of machine-specific information related to the user's machine.

Figure 7:
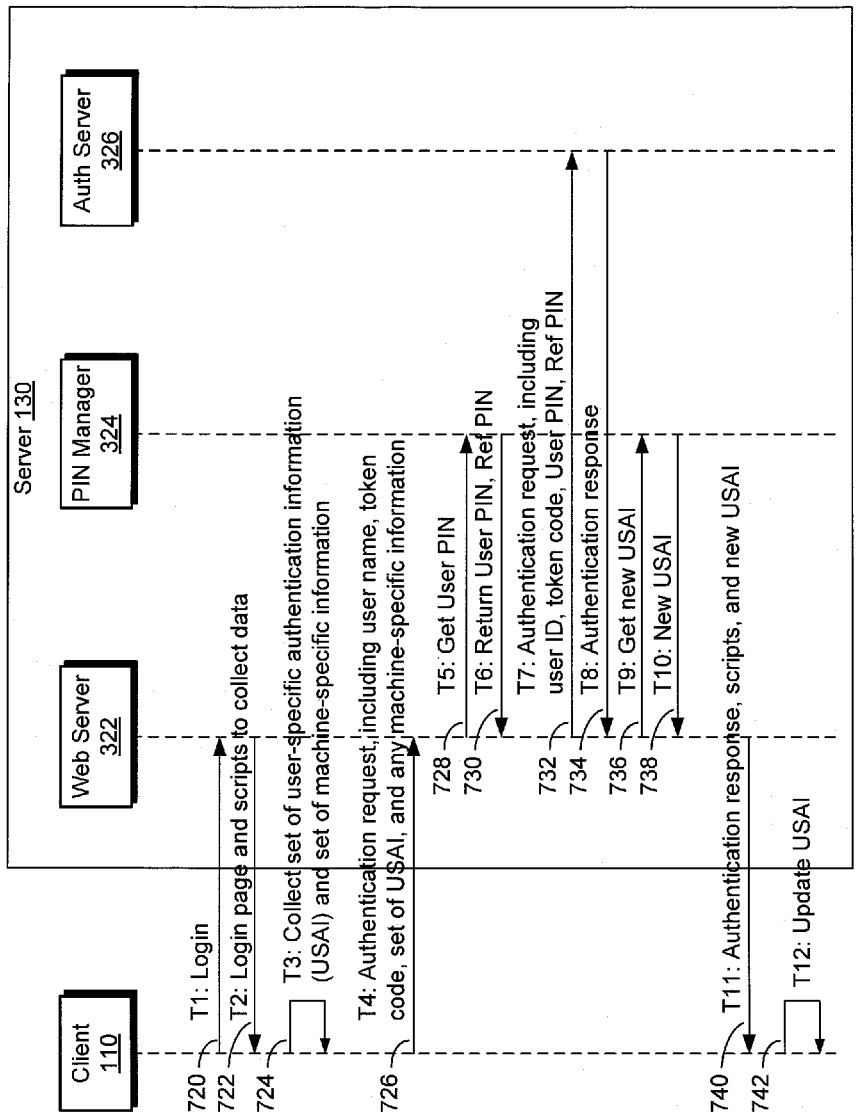
FIG. 7 is a sequence diagram showing an example process for authenticating users on successive login attempts based on a PIN derived from user-specific authentication information.

FIG. 7 shows a sequence of events for logging on a user 112 to the web application running on the server 130. The sequence of FIG. 7 is normally performed for a user on each successive login attempt after the user has logged in using the sequence of FIG. 6 on a first login attempt.

At time T1, the user, operating the client machine 110, attempts to log on to the web server 322, generally by opening a browser on the client machine 110 and navigating to the URL of the web application running on the web server 322 (event 720).

At time T2, the web server 322 responds to the login attempt by sending a login page (event 722). The login page may include scripts, or scripts may be provided in separate files. The user then enters his or her credentials (e.g., user ID and token code) into fields of the login page.

At time T3, the scripts are executed on the client machine 110 (event 724). The scripts include instructions to the client machine 110 to collect certain designated elements of user-specific authentication information. The scripts may also include instructions to collect certain machine-specific information.

At time T4, the user directs the browser of the client machine 110 to submit the authentication information to the web server, such as by clicking a "submit" button (event 726). An authentication request is then sent to the web server 322. The authentication request includes the user ID, token code, the collected elements of user-specific authentication information, and any collected machine-specific information.

At time T5, the web server 322 sends a request to the PIN manager 324 to obtain a PIN for the current user session (event 728). In response, the PIN manager 324 generates a user PIN from the user-specific authentication information and any machine-specific information received during event 726. In one example, the user PIN is generated by computing a hash code of the received elements of user-specific authentication information and machine-specific information. The PIN manager 324 also preferably computes a reference PIN at this time. The reference PIN is computed by collecting a set of user-specific authentication information and a set of machine-specific information from the counterpart copy in the user information database 350, which correspond to the information collected from the client machine 110. A hash code is then computed from the collected information from the counterpart copy.

At time T6, the PIN manager 324 sends the computed user PIN and reference PIN to the web server 322 (Event 730).

At time T7, the web server 322 sends an authentication request to the authentication server 326 on behalf of the user (event 732). The authentication request includes the user's user ID, the entered token code, the computed user PIN, and the computed reference PIN. The authentication server 326 then performs an authentication operation based on the received information.

At time T8, the authentication server 326 sends an authentication response to the web server 322 (event 734). Authentication is granted if the token matches its expected value for the user and the user PIN matches the reference PIN. Otherwise, authentication may be refused.

At time T9, the web server 322 sends the PIN manager 324 a request for new elements of user-specific authentication information (event 736).

At time T10, the PIN manager 324 responds by providing new elements of user-specific authentication information to the web server 322 (event 738).

At time T11, the web server 322 sends a response to client machine 110, replying to the authentication request made during event 726 (event 740). Also at this time, the new elements of user-specific authentication information obtained during event 738 are sent to the client machine 110, along with scripts including instructions for storing the new elements.

At time T12, the client machine 110 executes the downloaded scripts to update its store of user-specific authentication information in the file system 250 of the client machine 110. New elements of user-specific authentication information may be stored, and older elements of user-specific authentication information may be deleted.

At the completion of the sequence of FIG. 7, a user ID, token code, a set of user-specific authentication information, and a set of machine-specific information have been uploaded from the client machine 110 to the server 130. The server has generated a PIN, compared it with a reference PIN, and authenticated the user based on the reference PIN and token code.

While various embodiments of the invention have been particularly shown and described, it will be understood by those skilled in the art that various changes in form and details may be made therein.

For example, as shown and described, the user PIN is computed by the PIN manager 324 on the server 130. Alternatively, the user PIN may be computed by the client PIN manager 224 on the client machine 110. In this arrangement, the client machine 110 is provided with an algorithm for generating the user PIN, e.g., a hash code algorithm. Rather than sending the server 130 elements of user-specific authentication information collected from its file system 250 during login attempts, the client machine 110 can instead send the user PIN. Although this alternative approach can reduce network traffic, it can expose the PIN to malicious eavesdroppers and is therefore less secure than calculating the PIN on the server 130.

In addition, it is understood that the client machines 110a-n and server 130 may each include one or more computing machines, which can each be physical machines or virtual machines.

Also, although PINs are described as sequences of numerical digits, it is understood that PINs can include non-digit characters, such as letters, instead of, or in addition to, numerical digits. Also, although PINs are described as typically consisting of four to eight characters, it is understood that PINs can be of any length.

As described, client-side scripts are used to gather user-specific authentication information and machine-specific information from client machines 110. However, this is merely an example. According to a different example, a software component, such as an Active-X control, is installed on the client machine 110. The Active-X control operates in connection with a browser to gather detailed user-specific authentication information and machine-specific information from the client machine 110 and transmit the information to the server 130.

Also, the techniques disclosed herein may be embodied as a computer-readable storage medium, such as a magnetic disk, magnetic tape, compact disk, DVD, optical disk, flash memory, Application Specific Integrated Circuit (ASIC), Field Programmable Gate Array (FPGA), and the like. See, for example, medium 370 of FIG. 3. Multiple computer-readable media may be used. The medium (or media) may be encoded with instructions which, when executed on one or more computers or other processors, perform methods that implement the various embodiments described above. Such medium (or media) may be considered an article of manufacture or a machine, and may be transportable from one machine to another.

Various aspects of above-described embodiments may be used alone, in combination, or in a variety of arrangements not specifically set forth in the foregoing. For example, aspects described in one embodiment may be combined in any manner with aspects described in other embodiments. Also, the various methods or processes outlined herein may be encoded as software. The software may be written using any of a number of suitable programming languages and/or programming or scripting tools.

Those skilled in the art will therefore understand that various changes in form and detail may be made to the embodiments disclosed herein without departing from the spirit and scope of the invention as defined by the appended claims.

What is claimed is:

1. A method of authenticating a user, comprising:
providing user-specific authentication information to a client machine by a server that stores a counterpart copy of the user-specific authentication information, the client machine having a file system having multiple folders, the act of providing user-specific authentication information including directing a browser of the client machine to store different elements of user-specific authentication information in different folders of the file system;
receiving an authentication request from the client machine, the authentication request including (i) a user identifier identifying the user from among multiple users and (ii) a set of elements of the user-specific authentication information from at least two folders of the file system;
directing a personal identification number (PIN) to be computed based on the set of elements of the user-specific authentication information; and
performing an authentication operation based on the received user identifier and the PIN.

2. The method of claim 1, wherein the authentication request further includes a token code obtained from an authentication token, and wherein the act of performing the authentication operation is further based on the token code.

3. The method of claim 1,
wherein the elements of the user-specific authentication information include redundant copies of the same information stored in different elements, and
wherein the browser of the client machine is directed to store different redundant copies of the same information in different folders of the client machine.

4. The method of claim 3, wherein the PIN is computed based on a hash code of the set of elements of the user-specific authentication information.

5. The method of claim 1, wherein the user-specific authentication information comprises encrypted cookie information.

6. The method of claim 5, wherein the encrypted cookie information comprises at least one of Flash cookie information or SilverLight cookie information.

7. The method of claim 1, further comprising:
sending new elements of user-specific authentication information to the client machine on a regular basis; and
maintaining a copy of the new elements of user-specific authentication information in the counterpart copy stored on the server.

8. The method of claim 7, wherein different subsets of the user-specific authentication information are used to compute different PINs for different authentication requests.

9. The method of claim 8, wherein the PIN for a given authentication request is computed based on a portion of the respective subset of user-specific authentication information, with a remainder of the respective subset of user-specific authentication information not being used in computing the PIN.

10. The method of claim 7, further comprising:
obtaining machine-specific information from the client machine, wherein the machine specific information relates to a state of the client machine; and
storing the machine-specific information in the counterpart copy on the server,
wherein the PIN is computed based on both the machine-specific information and the set of elements of the user-specific authentication information.

11. The method of claim 10, wherein the machine-specific information comprises at least one of cookie information, IP address, location information, type of browser, preferred browser language, or user agent strings.

12. A server, comprising:
a network interface; and
a controller coupled to the network interface, the controller including at least one processor and memory to form a specialized circuit, the controller being constructed and arranged to:
provide, via the network interface, user-specific authentication information to a client machine, wherein the client machine maintains a file system having multiple folders, wherein the user-specific authentication information includes multiple elements, and wherein the controller is constructed and arranged to direct a browser of the client machine to store different elements of user-specific authentication information in different folders of the file system;
maintain a counterpart copy of the user-specific authentication information on the server;
receive, via the network interface, an authentication request from the client machine, the authentication request including (i) a user identifier identifying the user from among multiple users and (ii) a set of elements of the user-specific authentication information from at least two folders of the file system;
compute a personal identification number (PIN) based on the set of elements of the user-specific authentication information; and
perform an authentication operation based on the received user identifier and the PIN.

13. The server of claim 12,
wherein different elements of user-specific authentication information include redundant copies of the same information stored in different elements, and
wherein the controller is constructed and arranged to direct the browser of the client machine to store redundant copies of the same information in different folders of the client machine.

14. The server of claim 12, wherein the controller is constructed and arranged to compute the PIN based on different subsets of user-specific authentication information for different authentication requests.

15. The server of claim 14, wherein, for each authentication session, the controller is constructed and arranged to compute the PIN based on a hash code of the subset of user-specific authentication information used for that authentication session.

16. The server of claim 12, wherein the controller is constructed and arranged to provide the user-specific authentication information to the client machine in the form of encrypted cookie information.

17. The server of claim 12, wherein the controller is further constructed and arranged to:
obtain machine-specific information from the client machine, wherein the machine specific information relates to a state of the client machine; and
store the machine-specific information on the server,
wherein the controller is constructed and arranged to compute the PIN based on the machine-specific information and the set of elements of the user-specific authentication information.

18. A non-transitory computer readable media including instructions which when executed by a processor cause the processor to perform a method of authenticating a client machine, the method comprising:
providing user-specific authentication information to a client machine by a server that stores a counterpart copy of the user-specific authentication information, the client machine having a file system having multiple folders, the act of providing user-specific authentication information including directing a browser of the client machine to store different elements of user-specific authentication information in different folders of the file system;
receiving an authentication request from the client machine, the authentication request including (i) a user identifier identifying the user from among multiple users and (ii) a set of elements of the user-specific authentication information from at least two folders of the file system;
directing a personal identification number (PIN) to be computed based on the set of elements of the user-specific authentication information; and
performing an authentication operation based on the received user identifier and the PIN.

19. An authentication method, comprising:
receiving, by a client machine, user-specific authentication information from a server that stores a counterpart copy of the user-specific authentication information;
storing different elements of the received user-specific authentication information in different folders of a file system of the client machine;

collecting a set of elements of the stored user-specific authentication information from at least two folders of the file system;

computing a personal identification number (PIN) based on the collected set of elements; and issuing an authentication request to the server, the authentication request including (i) a user identifier to identify the user from among multiple users, (ii) a token code obtained from an authentication token, and (iii) the computed PIN.

20. The method of claim 1, wherein directing the personal identification number (PIN) to be computed specifies computation of the PIN based on the user-specific authentication information received with the authentication request, and wherein the method further comprises:

storing a counterpart copy of the user-specific authentication information on a server; and computing a reference PIN based on the user-specific authentication information in the counterpart copy, wherein performing the authentication operation includes comparing the PIN computed based on the user-specific authentication information received in the authentication request with the reference PIN to determine whether the two PINs match.

21. The method of claim 20, further comprising, prior to computing the reference PIN:

collecting a set of the user-specific authentication information from the counterpart copy; and collecting a set of machine-specific information from the counterpart copy, wherein computing the reference PIN is further based on the set of machine-specific information from the counterpart copy.

\* \* \* \* \*